United States Patent

[11] 3,581,054

[72] Inventor Jarl Allan Bjorkroth
 Avesta, Sweden
[21] Appl. No. 860,846
[22] Filed Sept. 24, 1969
[45] Patented May 25, 1971
[73] Assignee Avesta Jernverks Aktiebolag
 Avesta, Sweden
[32] Priority July 27, 1965
[33] Sweden
[31] 9876/65

[54] WELDING ELECTRODE
 7 Claims, No Drawings
[52] U.S. Cl. ................................................... 219/146
[51] Int. Cl. ..................................................... B23k 35/22
[50] Field of Search.......................................... 219/146,
 146.8, 145; 117/202, 206, 207; 148/24, 26

[56] References Cited
UNITED STATES PATENTS
2,820,725 1/1958 Wasserman.................. 117/206

Primary Examiner—J. V. Truhe
Assistant Examiner—Lawrence A. Rouse
Attorney—Brumbaugh, Free, Graves & Donohue ABSTRACT: A coated electrode for electric arc welding having a core comprising 0.01—0.05 percent carbon, 0.1—0.9 percent silicon, 0.2—2.5 percent manganese, 14.5—18.0 percent chromium, 3.5—6.0 percent nickel, 0.1—2.2 percent molybdenum, 0.02—0.12 percent nitrogen and the remainder iron. The proportion of the constituents are adjusted so that the chromium equivalent (e.g. percent chromium + percent silicon + percent molybdenum) plus the nickel equivalent (e.g. percent nickel + [0.5 × percent manganese] + [30 × (percent carbon + percent nitrigen)]) is between 24.5 and 27, and 1.4 times the chromium equivalent minus the nickel equivalent is between 16 and 19.3. The welding electrode yields a weld metal having a microstructure consisting of ferrite, martensite, and austenite.

WELDING ELECTRODE

This invention relates to a welding electrode for melting in an electric arc, more precisely it relates to a coated chromium-nickel-molybdenum alloy welding electrode which deposits a weld metal with high mechanical strength properties and good corrosion and wear resistance.

In the manufacture of certain heavy construction details, for example ship propellers, parts of water and steam turbines, pumps and valves for the cellulose industry etc., since a long time ago stainless steels have been used which were alloyed with about 12—14 percent chromium, up to about 3 percent nickel and in certain cases up to about 1 percent molybdenum. The microstructure of these steels is predominantly martensitic or ferrite-martensitic depending on the amount of carbon and chromium included in the alloy. In addition, a small amount of residual austenite may be present. These steel types have a yield point, an ultimate strength and a hardness substantially higher than of the austenitic stainless steels. The higher strength and hardness are achieved by a high carbon content, usually above 0.1, percent and by a suitable heat treatment, usually hardening and tempering followed by tempering.

At joint welding and buildup welding of stainless steels with a martensitic, ferrite-martensitic or ferrite-martensite-austenitic microstructure, welding electrodes have been used which deposit a weld metal having substantially the same composition as the aforementioned steels. The ferrite-martensitic electrodes heretofore used involve the disadvantage that the molten weld metal has a very poor ductility immediately after welding. For this reason, in order to avoid crack formation, a preheating treatment had to be applied during the welding operation proper and a stress relieving had to be carried out immediately after the completion of the welding operation. In certain cases, when a subsequent tempering could not be carried out, the welding was performed with austenitic stainless electrodes. However, as these electrodes yield a weld metal with a yield point and a hardness substantially lower than of ferrite-martensitic electrodes, this method gave rise to problems in the welded construction under unfavorable operation conditions.

It has been discovered by a great number of experiments that it is possible to eliminate the disadvantages which are connected with the welding of stainless steels having a predominantly martensitic or ferrite-martensitic structure, by using a welding electrode of a special type of alloy so composed that it deposits a weld metal, the microstructure of which consists of ferrite, martensite and austenite, in combination with an extra low carbon content. The welding electrode according to the present invention shall have a carbon content below 0.05 percent, preferably below 0.04 percent, whereby carbide precipitations at heating and cooling are avoided. The carbon is precipitated from the martensite phase in the form of uniformly distributed carbides and, therefore, no precipitation takes place in the grain boundaries.

It is essential for the new electrode that at the same time as the carbon content is reduced to the lowest possible value, the alloying elements affecting the structure are to be kept within narrow limits and the ferrite forming elements be balanced in relation to the austenite forming elements according to instructions given in the following. By proceeding in this way, the welding electrode will yield a weld metal with a three-phase microstructure, composed of ferrite, martensite and austenite, which structure under the prerequisite conditions mentioned imparts to the weld metals its characteristic properties, viz. high mechanical strength properties in combination with good corrosion and wear resistance.

The new welding electrode shows a further characterizing property, viz. that the deposited weld metal allows for temperatures at stress relieving which are lower than those used at welding with conventional stainless electrodes. The weld metal is given optimum strength properties at annealing in the temperature range 550—650° C. (approx. 1,020—1,200° F.). This results in great advantages in the manufacture of pressure vessels, reactors or other welded constructions where a stress relieving is desired. By stress relieving within said temperature range, there is only a minimum risk of deformation and distortions.

According to the preferred embodiment of the new welding electrode has a core of a chromium-nickel-molybdenum alloy material and a special coat of slag-forming substances and flux agents as well as alloying elements, deoxidizing agents and plastifying substances (slipping agents). The electrode core in this case has to contain all alloying elements affecting the structure, and the coat includes only a compensation for the consumption which is normal at arc welding with a coated electrode.

It also lies within the scope of the invention to protect an electrode coat which in addition to the aforementioned base substances is supplied with an extra addition of alloying elements intended to compensate for one or several of the alloying elements chromium, nickel, molybdenum and manganese if these elements are not contained in the core or if the core contains much too small contents thereof. The total of the alloying elements in the core and coat is so to be adjusted that they together are within the analysis limits indicated, and that the electrode deposits a weld metal with an extra low carbon content and a ferrite-martensite-austenite microstructure.

Other objects and characterizing features will become evident from the following description in greater detail of the invention.

According to the present invention referring above all to a coated welding electrode, the core of the electrode shall consist of a material having the chemical analysis as follows:

|  | Percent |
| --- | --- |
| Carbon | 0.01–0.05 |
| Silicon | 0.1–0.9 |
| Manganese | 0.2–2.5 |
| Chromium | 14.5–18.0 |
| Nickel | 3.5–6.0 |
| Molybdenum | 0.1–2.2 |
| Nitrogen | 0.02–0.12 |

The remainder is iron, apart from unavoidable residues or traces of undesirable elements.

The alloying constituents shall so be adjusted in relation to each other that the chromium equivalent plus the nickel equivalent is not less than 24.5 and not more than 27 and that 1.4 times the chromium equivalent minus the nickel equivalent is not less than 16 and not more than 19.3, the chromium equivalent being the sum of percent of chromium plus percent silicon plus percent molybdenum, and the nickel equivalent being the sum of percent nickel plus 0.5 times percent manganese plus 30 times (percent carbon plus percent nitrogen), the electrode depositing a weld metal with a microstructure consisting of ferrite, martensite and austenite in both welded and tempered state.

The electrode coat can be applied to the core according to previously known methods, for example by the extrusion method. The coat consists substantially of calcium carbonate, calcium fluoride and titanium dioxide. The coat further includes alloying elements and deoxidizing agents. The alloying elements normally are added in order to compensate for the consumption caused by the arc on the alloying contents of the core wire, but as mentioned above they may also be added in order to compensate for or raise the contents of the core material of one of several alloying substances. As deoxidizing agents low-carbon ferrosilicon and electrolytic manganese metal have proved suitable. Manganese is also an alloying element which is added in order to compensate for the consumption in the arc or for increasing the manganese content of the electrode.

For improving the extrudability of the coating mass, there is further added a certain amount of plastifying substances and binding agents. Water soluble aluminum silicates such as kaolin and/or bentonite, in combination with a silicate binding agent, have proved suitable to render the mass ductile. These aluminum silicates when being added in great amounts have an unfavorable effect in the behavior of the welding slag. It, therefore, has been deemed suitable to limit the water soluble aluminum silicates to at maximum 8 percent of the coating weight.

For counteracting the aforesaid unfavorable effect, the metal zirconium has proved suitable. Zirconium is added to the coat preferably in the form of silicate, but it may also be added as zirconium oxide. In this case there must be a certain ratio between the added amount of zirconium silicate on the one hand and the amount of water soluble aluminum silicate on the other hand.

An example of a suitable coat composition is shown in Table I.

TABLE I

| Ingredients in parts by weights of dry flux | Broad range | Preferred range | Example |
| --- | --- | --- | --- |
| Calcium carbonate | 25–45 | 30–40 | 35 |
| Calcium fluoride | 20–40 | 25–35 | 31 |
| Titaniumdioxide | 1–10 | 3–7 | 4 |
| Kaolin or/and bentonite | 1–8 | 2–6 | 5 |
| Zirconium silicate | 1–12 | 2–9 | 7 |
| Alloying elements and deoxidizers | 10–30 | 15–25 | 18 |

The total of the contents of calcium carbonate, calcium fluoride and titanium dioxide must not exceed 85 percent. The ratio between the amount of zirconium silicate and the amount of kaolin and/or bentonite shall be between 0.75 and 2.5, preferably between 1.25 and 2.0.

To 100 parts by weight of the aforementioned dry powder mixture are added 12—22 parts by weight of water glass as a binding agent. The binding agent may be only sodium water glass or a mixture of sodium water glass and potassium water glass with the molecular ratio as follows:

$SiO_2 : Na_2O = 2.8–3.3$
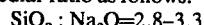
$SiO_2 : K_2O = 2.9–3.4$
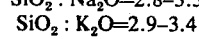

Extensive investigations with respect to the mechanical strength properties of the weld metal have been carried out with different electrode compositions within the scope of the invention. The weld joint was made as a wide V-joint between two metal sheets of 14 mm. thickness with the analysis of about 16 percent chromium, about 5 percent nickel, about 1 percent molybdenum and a carbon content $\leq 0.03$ percent. The testing method is described a.o. in DIN 1913 sheet 2, ASTM spec. No. A298-62T. From the weld joint were taken all-welded tensile test bars with the diameter 10.0 mm. (about 3/8 inch) of standardized type, SIS 11.21.13. The impact test bars were of the type Charpy V according to SIS 11.23.51 which is equal to ISO standard R148-1960. Table II shows typical strength values for coated electrodes within the scope of the invention.

chemical analysis is determined on that part of the weld buildup located further away from the sheet metal than 10 mm. Hereby the effect from the base material is eliminated.

The coating for electrode A and B was of the type as stated in table I. Weld metal tests carried out with 5 mm. (ab. 3/16 inch) electrode according to the aforementioned method resulted in heat-treated state in the values shown in table III.

TABLE III

| | Electrode A | | Electrode B | |
| --- | --- | --- | --- | --- |
| | Core | Weld metal | Core | Weld metal |
| Chemical analysis: | | | | |
| Carbon | 0.029 | 0.034 | 0.016 | 0.020 |
| Silicon | 0.50 | 0.61 | 0.32 | 0.44 |
| Manganese | 0.80 | 1.10 | 1.30 | 1.18 |
| Chromium | 16.1 | 16.3 | 13.6 | 16.9 |
| Nickel | 5.0 | 5.1 | 4.7 | 4.8 |
| Molybdenum | 0.98 | 1.07 | 0.05 | 0.99 |
| Nitrogen | 0.046 | 0.080 | 0.056 | 0.061 |
| Iron | (1) | (1) | (1) | (1) |
| Tensile test specimens: | | | | |
| Yield strength (kg./mm.²) | | 55 | | 57 |
| Ultimate strength (kg./mm.²) | | 95 | | 9/2 |
| Elongation (percent) | | 19 | | 290 |
| Charpy V notch (kgm./cm.²), impact values, +20° C | | 6.5 | | 6 |

¹ Balance.

It has been mentioned before, that the welding electrode according to the invention shall comprise a core and a coating composition adjusted to the core. This does not exclude, however, that other embodiments may exist, without thereby deviating from the nature of the invention. To the expert in the associated art it is clear that it is possible to select core wires of such a composition that they without surrounding flux coat can be used as filler metal at other welding methods, as for example at melting in an inert gas consisting of argon or helium or mixtures thereof.

One example of the composition of a core wire which was used at inert gas metal arc welding is shown in table IV together with the analysis of the deposited weld metal. The base material was of the type 16 Cr/5 Ni/1 Mo.

TABLE IV

| | Bare welding electrode C, percent | Weld metal from electrode C, percent |
| --- | --- | --- |
| Elements: | | |
| Carbon | 0.033 | 0.030 |
| Silicon | 0.39 | 0.38 |
| Manganese | 1.09 | 0.97 |
| Chromium | 16.4 | 16.0 |
| Nickel | 5.0 | 4.8 |
| Molybdenum | 1.05 | 1.01 |
| Nitrogen | 0.040 | .052 |
| Iron | Balance | Balance |

TABLE II

| Testing conditions | Yield strength 0.2% offset, in. | | Ultimate tensile, strength, in. | | Elongation in 2 in. (50 mm.) percent | Impact values at room temperature | | Hardness Vickers |
| --- | --- | --- | --- | --- | --- | --- | --- | --- |
| | Kg./mm.² | P.s.i. | Kg./mm.² | P.s.i. | | Kgm/cm.² | Ft. lbs. | |
| As welded | 50–55 | 71,000–78,500 | 70–85 | 74,000–81,000 | 10–15 | 4–7 | 23–40 | 240–280 |
| Heat treated at 600° C. 2 hr. (ab. 1,110° F.) | 52–57 | 100,000–121,000 | 80–95 | 114,000–135,000 | 16–22 | 4–7 | 23–40 | 290–310 |

Within the analysis limits set for the invention it is possible, of course, to find electrode compositions rendering yield strength and ultimate strength values exceeding those in the table, but simultaneously lower elongation and impact values. It is possible as well to select other analyses rendering elongation and impact values exceeding the upper values indicated, if the yield strength is allowed to be lower than indicated by the lower limit value in the table. The invention, thus, leaves much freedom in selecting electrode compositions with properties adjusted to different purposes.

Of the electrodes according to the invention which were tested with respect to weld and strength properties, table III shows examples of the composition of the core and weld metal for two coated welding electrodes. The weld metal was analyzed in the way prescribed by the standard of different countries, for example DIN 8556, sheet 2, i.e. a weld joint is applied on sheet metal with a great number of beads and the

I claim:

1. An electrode of electric arc welding comprising a core of the composition 0.01—0.05 percent carbon, 0.1—0.9 percent silicon, 0.2—2.5 percent manganese, 14.5—18.0 percent chromium, 3.5—6.0 percent nickel, 0.1—2.2 percent molybdenum, 0.02—0.12 percent nitrogen, the remainder being iron, apart from unavoidable impurities, at which electrode the alloying constituents shall be so adjusted in relation to each other that the chromium equivalent plus the nickel equivalent is not less than 24.5 and not more than 27 and 1.4 times the chromium equivalent minus the nickel equivalent is not less than 16 and not more than 19.3, the chromium equivalent being the sum of percent chromium plus percent silicon plus percent molybdenum, and the nickel equivalent being the sum of percent nickel plus 0.5 times percent manganese plus 30 times (percent carbon plus percent nitrogen) whereby the electrode deposits a weld metal which in welded or tempered state has microstructure consisting of ferrite, martensite and austenite.

2. An electrode according to claim 1, and further comprising a coating, which apart from the binding agents, has a composition within the limits as follows:

| | Parts by weight |
|---|---|
| Calcium carbonate | 24–45 |
| Calcium fluoride | 20–40 |
| Titanium dioxide | 1–10 |
| Kaolin and/or bentonite | 1–8 |
| Zirconium silicate | 1–12 |
| Alloying and deoxidizing agents | 10–30 |

3. A coated electrode according to claim 6 wherein the sum of the amount of calcium carbonate, calcium fluoride and titanium dioxide is less than 85 percent of the weight of the coating mass and that the ratio between the added amount by weight of zirconium silicate and the amount of kaolin and/or bentonite is between 0.75:1 at minimum and 2.5:1 at maximum.

4. A coated electrode according to claim 6 wherein the core together with the coating contains the following alloying elements affecting the microstructure of the weld metal: 0.01–0.05 percent carbon, 0.1–0.9 percent silicon, 0.2–2.5 percent manganese, 14.5–19.0 percent chromium, 3.5–6.0 percent nickel, 0.1–2.2 percent molybdenum and 0.02–0.12 percent nitrogen whereby the electrode deposits a low carbon weld metal with a ferrite-martensite-austenitic microstructure.

5. A coated electrode according to claim 8 wherein the sum of the amount of calcium carbonate, calcium fluoride and titanium dioxide is less than 85 percent of the weight of the coating mass and the ratio between the added amount by weight of zirconium silicate and the amount of kaolin and/or bentonite is between about 0.75:1 and 2.5:1.

6. An electrode according to claim 1 and further comprising a coating, the core together with the coating containing the following alloying elements affecting the microstructure of the weld metal: 0.01–0.05 percent carbon, 0.1–0.9 percent silicon, 0.2–2.5 percent manganese, 14.5–18.0 percent chromium, 3.5–6.0 percent nickel, 0.1–2.2 percent molybdenum and 0.02–0.12 percent nitrogen whereby the electrode deposits a low carbon weld metal with a ferrite-martensite-austenitic microstructure.

7. A method of using core wire material according to claim 1, wherein the core wire is melted in an atmosphere of inert gas without flux coating.

PO-1050
(5/69)

UNITED STATES PATENT OFFICE
CERTIFICATE OF CORRECTION

Patent No. 3,581,054        Dated May 25, 1971

Inventor(s) Jarl Allan Bjorkroth

It is certified that error appears in the above-identified patent and that said Letters Patent are hereby corrected as shown below:

Column 1, line 66, "metals" should be --metal--. Column 2, line 5, after "embodiment" delete --of--. Column 4, lines 1 and 2, "buil-dup" should be --build-up--; line 22, "9/2" should be --92--; line 23, "290" should be --20--; line 24, "noctch" should be --notch--; line 63, "of" first occurrence should be --for--. Column 5, lines 15 and 21, the claim reference numeral "6", each occurrence, should be --2--. Column 6, line 6, the claim reference numeral "8" should be --4--.

Signed and sealed this 22nd day of February 1972.

(SEAL)
Attest:

EDWARD M. FLETCHER, JR.        ROBERT GOTTSCHALK
Attesting Officer               Commissioner of Patents